United States Patent [19]

Mochizuki et al.

[11] Patent Number: 4,555,746
[45] Date of Patent: Nov. 26, 1985

[54] ORGANIC CHIP CAPACITOR

[75] Inventors: Hideaki Mochizuki, Higashiosaka; Tooru Tamura, Ikeda, both of Japan

[73] Assignee: Matsushita Electric Industrial Co., Ltd., Osaka, Japan

[21] Appl. No.: 570,028

[22] Filed: Jan. 11, 1984

[30] Foreign Application Priority Data

Jan. 12, 1983 [JP] Japan .................................. 58-3671
Jan. 12, 1983 [JP] Japan .................................. 58-3672
Jan. 12, 1983 [JP] Japan .................................. 58-3673

[51] Int. Cl.$^4$ .......................... H01G 4/08; H01G 1/14
[52] U.S. Cl. ...................................... 361/323; 361/309
[58] Field of Search ................ 361/320, 321, 323, 309

[56] References Cited

U.S. PATENT DOCUMENTS

| 3,049,651 | 8/1962 | Adelson et al. | 361/323 X |
| 3,214,657 | 10/1965 | Davis | 361/323 |
| 3,215,909 | 11/1965 | Schill et al. | 361/323 X |
| 3,654,532 | 4/1972 | Rayburn | 361/323 X |
| 3,740,623 | 6/1973 | Toro | 361/323 X |
| 3,811,937 | 5/1974 | Maher | 361/320 X |

Primary Examiner—Donald A. Griffin
Attorney, Agent, or Firm—Wenderoth, Lind & Ponack

[57] ABSTRACT

A chip film capacitor laminated at both sides with vapor coated metal electrodes and heat resistant films of heat resistant resin dielectrics, the laminated body having at both sides common metal electrode element, which is characterized by providing no lead wire and being soldered directly onto a substrate.

8 Claims, 9 Drawing Figures

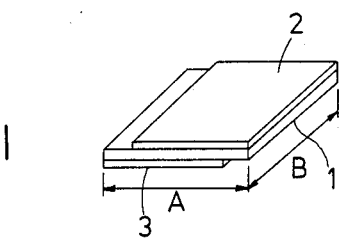
FIG.1
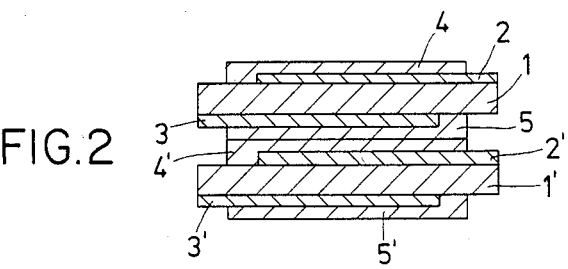
FIG.2
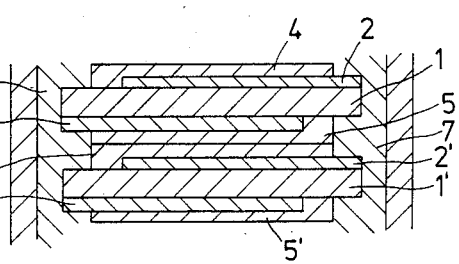
FIG.3
FIG.4

ORGANIC CHIP CAPACITOR

BACKGROUND OF THE INVENTION

1. Field of the Invention

This invention relates to a plastic film capacitor.

2. Prior Art

Miniaturization of electric and electronic instruments depends largely the high packaging density of the circuit. Developments in chip electronic components have positively been promoted for the purpose of high density packaging and standardization of process. Various chip capacitors have also been developed, especially in the field of ceramic capacitors. However, no chip film capacitors capable of withstanding soldering have been put into practical use, because the plastic film constituting the dielectric has a lower heat resistance. The films used now in film capacitors will entirely be molten or extremely deformed at a high temperature of 220° C. to 260° C. Hence, such fatal defects were inherent in that, during the soldering, an element is largely deformed, a short circuit occurs between the electrodes, and capacity remarkably varies. On the other hand, commercially available films are so large in thickness that the element will be large-sized in order to get the necessary electric capacity, and too large in dielectric tangent or too high in manufacturing cost to be used alone as a capacitor.

A laminated capacitor conventionally has been proposed in U.S. Pat. No. 3,654,532, which targets a usual package system having lead wires, but no considerations have been taken concerning the heat resistance of the capacitor which has no lead wire and is soldered directly onto the substrate. Hence, the heat resistance of the film and dielectric are not at all referred to.

SUMMARY OF THE INVENTION

An object of the invention is to increase the heat resistance of a chip film capacitor to thereby provide a small-sized chip film capacitor which can withstand soldering by both the reflow soldering method and the dip soldering method. For attaining this object, this invention provides a chip film capacitor comprising electrodes formed at both sides of a heat resistant film, a heat resistant resin dielectric sandwiched between said heat resistant film and another heat resistant film having the same construction, and metal layers as common electrodes provided, after lamination, at the end faces of the laminated films, thereby enabling direct soldering.

The heat resistant film needs be made of a material which is not molten or extremely deformed at a temperature of 260° C., which concretely includes the film of polyimide resin or polyamide resin in part. The electrodes formed onto the heat resistant film need have good electric conductivity and recover the insulating property of a defective portion by applying voltage (the so-called self-healing properties), to which concretely includes aluminum, nickel or copper. Also, vacuum decomposition or sputtering is suitable for formation of these metal electrodes.

The heat resistant resin dielectric employs one or two or more combinations of thermoplastic resins having a glass transition temperature of 170° C. or more, or thermosetting resins having a thermal decomposition temperature of 300° C. The thermoplastic resin concretely includes polysulfone resin, polyether sulfone resin and polyphenylene oxide, each of which can solely form a chip film capacitor which can be soldered by the reflowing method. The thermosetting resin includes diaryl phthalate, cross-linking polybutadiene, unsaturated polyester resin, benzotriazine resin and epoxy resin, each of which dielectrics can solely form a chip film capacitor capable of being subjected to dip soldering. Also, the dielectric can be of two layers of one of polyphenylene oxide superior especially in the electric characteristic and the other of the aforesaid thermosetting resin, thereby forming a chip film capacitor lower in dielectric loss and capable of being subjected to dip soldering. Also, one of the two layers of dielectric uses either diaryl phthalate resin or cross-linking polybutadiene resin and the other uses a selected one of the aforesaid thermoplastic resins to thereby form a chip film capacitor less in dielectric loss and capable of being subjected to the dip soldering. After plastic films forming the aforesaid dielectrics on the vapor coated metal electrodes are laminated in a number sufficient to provide the necessary electric capacity, at both lateral sides of the laminated body are formed common electrodes for connecting in parallel capacitors comprising the laminated dielectric layer. Since the heat resistant film has too high a melting temperature to be completely bonded by normal metal spraying, the present invention uses the plasma metal spraying to previously form at the lateral side of the laminated layer a base layer of aluminum, copper or nickel, of 0.05 to 0.30 mm in thickness, and then forms thereon a second layer, such as a soldering alloy, of 0.1 to 0.5 mm in thickness capable of being soldered. Therefore, the common electrode for external connection is formed which has a strong adhesive strength and maintains stable bonding strength even after being soldered.

The above and other objects and features of the invention will become more apparent from the following detailed description taken togeter with the accompanying drawings in which:

BRIEF DESCRIPTION OF THE DRAWINGS

FIGS. 1 and 5 are perspective views of heat resistant films each having electrodes vapor-coated on both sides, FIGS. 2 and 6 are sectional views showing two layers of the film, FIG. 3 is a sectional view of the laminated films subjected to metal spraying, FIG. 4 is a perspective view of the laminated films in FIG. 3.

DESCRIPTION OF THE PREFERRED EMBODIMENTS

Figure 5:
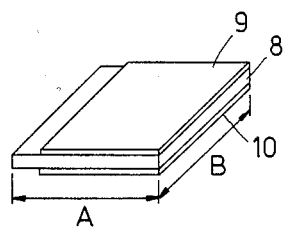

Next, embodiments of the invention will be described in accordance with the drawings. Referring to FIG. 1, a heat resistant film 1 is cut to 4 mm in width A and 3 mm in length B, both sides of film 1 being overall subjected to aluminum vapor coating except for a margin of 1.0 mm at a widthwise different end of each surface, thereby forming electrodes 2 and 3. Referring to FIG. 2, at one side of film 1 carrying the electrode 2 is formed a first heat resistant resin dielectric layer 4 except for margins each of 0.5 mm at both widthwise ends of film 1, and at the other side carrying the electrode 3 is formed a second heat resistant resin dielectric layer 5 in the same manner as the above, thereby being completely cured. A heat resistant film 1' carrying the electrodes 2' and 3', a first heat resistant resin dielectric layer 4' and a second heat resistant resin dielectric layer 5', which are formed similarly to the above, is adhered to the heat resistant film 1 in the relation that the second dielectric layer 5 is in contact with the first dielectric layer 4' as shown in FIG. 2, in which the vapor coated electrodes 3 and 2' overlap with each other by 3 mm in length and 2 mm in width. Then, similarly, films are laminated sequentially to form laminated films of 100 layers, the films being heated at a temperature of 200° to 240° C. for 10 min while being pressed lightly by a pressure of 0.5 to 5 kg/cm², thereby completely bonding each layer. The laminated films are subjected at both widthwise sides to aluminum plasma spraying so that an electrode 7 is led out from the vapor-coated electrodes 2 and 2' and an electrode 6 from those 3 and 3' as shown in FIGS. 3 and 4. Soldering alloy is further arc-sprayed onto the plasma sprayed metal electrodes 6 and 7 to form the sprayed electrodes 6' and 7', the soldering alloy being 0.1 to 0.5 mm in thickness.

Table 1 shows a concrete combination of heat resistant film, thermoplastic resin and thermosetting resin, used in the aforesaid embodiment. Table 2 shows the initial characteristics of combination examples and the characteristics after being dipped in a soldering bath at a temperature of 260° C. for 10 seconds, or heated by an infrared lamp at a temperature of up to 220° to 230° C. for one minute. In addition, for comparision, the performance of a commercially available polyester film capacitor also is entered into Table 2.

It has been found from Table 2 that the commercially available polyester film capacitors of vapor coating electrode type (a) and aluminum foil electrode type (b) both cannot withstand heating at a temperature of 230° C. for one minute while the combination example No. 9 among the embodiments of the invention, which comprises thermoplastic resin only, can withstand heating at a temperature of 230° C. for one minute and other examples retain sufficient performance even when dipped in the soldering bath at a temperature of 260° C. for 10 seconds.

Figure 6:
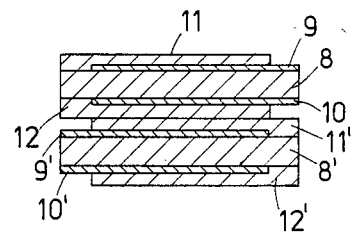

Next, explanation will be given as to a second embodiment different in electrode construction from the first embodiment in accordance with FIGS. 5 and 6. Referring to FIG. 5, a heat resistant film 8 is cut to 4 mm in width A and 3 mm in length B, both surfaces of which are overall aluminum vapor-coated except for margins each of 0.5 mm at the same side ends of both surfaces, thereby forming electrodes 9 and 10. Referring to FIG. 6, a first heat resistant resin dielectric layer 11 of 3.5 mm in width is formed at the surface carrying the electrode 9 and a margin of 0.5 mm remains adjacent to the widthwise end face of heat resistant film 8 so as to expose a part of the electrode 9, while a second heat resistant resin dielectric layer is formed at the surface of film carrying the electrode 10 in the same manner as the above, thereby being completely cured. A heat resistant film 8', on which electrodes 9' and 10', a first dielectric layer 11' and a second dielectric layer 12' are formed, is stuck to the heat resistant film 8 in such a manner that the first dielectric layer 12 on one film and the second dielectric layer 11' on the other come into contact with each other as shown in FIG. 6, at which time the electrodes are exposed reversely at every layer and the overlapping portions of opposite electrodes 9' and 10 are 3 mm in length and 3 mm in width respectively. Then similarly films are laminated sequentially to form the laminated film of 100 layers and thereafter are heated at a temperature of 200° to 240° C. for 10 minutes while being lightly vertically pressed, thus completely bonding the layers of laminated film. Next, both widthwise lateral surfaces of laminated films have been aluminum-plasma-sprayed 0.05 to 0.3 mm in thickness and then a soldering alloy has been arc-sprayed thereon by 0.3 mm in thickness to form outer electrodes. Table 3 shows concrete combinations of dielectric layers used in the present invention. Table 4 shows the initial characteristic of each combination example and the characteristic thereof after being dipped in the soldering bath at a temperature of 260° C. for 10 seconds, or heated by the infrared lamp at a temperature of 220° to 230° C. for 1 minute.

As seen from Table 4, all the embodiments of the invention have superior heat resistance and the chips are capable of being soldered to the substrate.

Next, explanation will be given as to a third embodiment different in construction of electrode from the former embodiments, in accordance with FIGS. 7 and 8.

Figure 7:
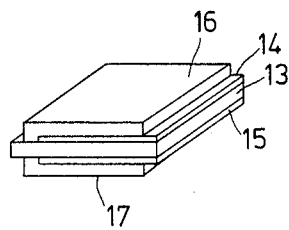
FIG. 7 is a perspective view of the film on which a dielectric is formed.
Figure 8:
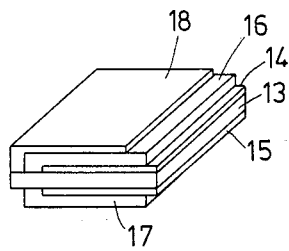
FIG. 8 is a perspective view of the film forming electrodes on the dielectric.
Figure 9:
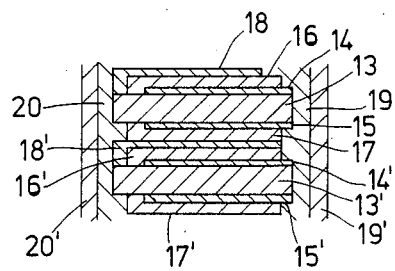
FIG. 9 is a sectional view of the heat resistant films laminated and in the condition of being subjected to metal spraying.

A heat resistant film 13, as shown in FIG. 7, is cut to 4 mm in width A and 3 mm in length B, both surfaces of which are overall aluminum-vapor-coated except for margins each of 0.5 mm from one end at the same side of each surface, thereby forming electrodes 14 and 15. At the both surfaces of heat resistant film 13 are overall formed dielectric layers 16 and 17 except for margins each of 0.3 mm from both widthwise ends of film 13, at which time the dielectric layers 16 and 17 are kept perfectly cured without the remainder solvent when using thermosetting resin. Then, aluminum, as shown in FIG. 8, is vapor-coated on the one-side of dielectric layer 16 at 3.5 mm in width except for a portion of 0.5 mm in width at the electrode 4 exposing side, thereby forming an electrode 18. In other words, the electrodes 18 and 13 are opposite to each other through a portion of 3 mm in length and 3 mm in width. Thus, the electrodes 14, 15 and 18 and dielectric layers 16 and 17 are formed on a number of heat resistant films and thereafter the films are laminated in 100 layers. The films, after being laminated, are pressed vertically by pressure of 1.0 to 10 kg/cm² at a temperature of 100° to 150° C. and subjected, as they are, to aluminum plasma spraying on the exposed portions of electrodes 14, 15 and 18 at both widthwise sides, thereby forming electrodes 19 and 20 for connecting each layer as shown in FIG. 9. Next, the arc-metal-spraying is applied onto the plasma-sprayed metal layer to form soldering alloy layers 19' and 20', thereby completing the capacitor. The plasma spraying metal layers 19 and 20 each are 0.2 mm in thickness, and the soldering alloy layers 19' and 20' each of 0.2 mm in thickness. Table 5 shows concrete combination of heat resistant film, thermoplastic resin, and thermo-setting resin. Also, Table 6 shows the initial characteristics of combination examples and the characteristics after the heat resistance test. As seen from Table 6, the embodiments of the invention all have the superior heat resistance and are capable of being soldered.

Although some embodiments have been described above, they are only for an explanation of the invention. Therefore, it should be understood that various changes and modifications are possible within the scope of the present invention.

TABLE 3-continued

| Combination Example No. | Heat Resistant Film Kind | Thickness ($\mu$) | First Heat Resistant Resin Dielectric Kind | Thickness ($\mu$) | Second Heat Resistant Resin Dielectric Kind | Thickness ($\mu$) |
| --- | --- | --- | --- | --- | --- | --- |
| 20 | Polyimide | 7.0 | Polysulfone | 1.0 | Polysulfone | 1.0 |

TABLE 4

| | Initial Characteristic | | | After Heat Resistance Test* | | | Soldering Heat Resistance |
| --- | --- | --- | --- | --- | --- | --- | --- |
| No. | Capacity | Dielectric Tangent | Insulation Resistance | Capacity | Dielectric Tangent | Insulation Resistance | |
| Combination Example | | | | | | | |
| 11 | 13.1 nF | 0.19% | $1 \times 10^{12} \Omega$ | 13.0 nF | 0.17% | $2 \times 10^{12} \Omega$ | ○ |
| 12 | 9.9 nF | 0.08% | $1 \times 10^{12} \Omega$ | 10.1 nF | 0.08% | $2 \times 10^{12} \Omega$ | ⊙ |
| 13 | 10.5 nF | 0.12% | $2 \times 10^{12} \Omega$ | 10.4 nF | 0.11% | $2 \times 10^{12} \Omega$ | ○ |
| 14 | 11.2 nF | 0.16% | $2 \times 10^{12} \Omega$ | 11.2 nF | 0.15% | $3 \times 10^{12} \Omega$ | ○ |
| 15 | 12.8 nF | 0.15% | $2 \times 10^{12} \Omega$ | 12.7 nF | 0.14% | $2 \times 10^{12} \Omega$ | ○ |
| 16 | 13.1 nF | 0.09% | $2 \times 10^{12} \Omega$ | 13.0 nF | 0.08% | $2 \times 10^{12} \Omega$ | ○ |
| 17 | 12.3 nF | 0.17% | $3 \times 10^{12} \Omega$ | 12.4 nF | 0.15% | $3 \times 10^{12} \Omega$ | ○ |
| 18 | 9.8 nF | 0.07% | $1 \times 10^{12} \Omega$ | 9.9 nF | 0.07% | $1 \times 10^{12} \Omega$ | ○ |
| 19 | 15.1 nF | 0.15% | $1 \times 10^{12} \Omega$ | 15.5 nF | 0.14% | $1 \times 10^{12} \Omega$ | ○ |
| 20 | 13.9 nF | 0.20% | $1 \times 10^{12} \Omega$ | 13.8 nF | 0.18% | $1 \times 10^{12} \Omega$ | ○ |

*Heat Resistance Test: No. 20: Infrared Lamp at 230° C. for 1 min.
Others: Dipped in Soldering Bath at 260° C. for 10 sec.
°Dielectric Loss Tangent and Capacity are measured by 1 kHz, Insulation Resistance by 25V.

TABLE 5

| Combination Example No. | Heat Resistant Film Kind | Thickness ($\mu$m) | Dielectric Layer Kind | Thickness ($\mu$m) |
| --- | --- | --- | --- | --- |
| 21 | Polyimide | 7 | Polyphenylene Oxide | 2 |
| 22 | Polyparabanic Acid | 12.5 | Polyphenylene Oxide | 2 |
| 23 | Polyimide | 7 | Polysulfone | 2 |
| 24 | Polyimide | 7 | Polyether sulfone | 2 |
| 25 | Polyimide | 7 | Cyclization Polybutadiene | 2 |
| 26 | Polyimide | 7 | Diaryl Phthalate | 2 |
| 27* | Polyimide | 7 | Benzotriazine Resin | 1 |
| | | | Polyphenylene Oxide | 1 |
| 28* | Polyimide | 7 | **Epoxy Resin | 0.5 |
| | | | Polyphenylene Oxide | 1.5 |

*Dielectric 2 Layer Construction (Undercoat of Thermosetting Resin)
**High Temperature Setting Epoxy Resin

TABLE 6

| | Initial Characteristic | | | After Soldering Bath Dipping Test* | | | Soldering Heat Resistance |
| --- | --- | --- | --- | --- | --- | --- | --- |
| No. | Capacity | tan δ | Insulation Resistance | Capacity | tan δ | Insulation Resistance | |
| Combination Example | | | | | | | |
| 21 | 20.0 nF | 0.06% | $1 \times 10^{12} \Omega$ | 20.4 nF | 0.05% | $1 \times 10^{12}$ | ○ |
| 22 | 20.8 nF | 0.06% | $1 \times 10^{12} \Omega$ | 21.1 nF | 0.06% | $1 \times 10^{12}$ | ○ |
| 23 | 24.3 nF | 0.10% | $1 \times 10^{12} \Omega$ | 24.4 nF | 0.09% | $1 \times 10^{12}$ | ○ |
| 24 | 27.7 nF | 0.15% | $1 \times 10^{12} \Omega$ | 27.8 nF | 0.13% | $1 \times 10^{12}$ | ○ |
| 25 | 18.5 nF | 0.05% | $2 \times 10^{12} \Omega$ | 18.4 nF | 0.04% | $3 \times 10^{12}$ | ○ |
| 26 | 28.3 nF | 0.10% | $2 \times 10^{12} \Omega$ | 28.2 nF | 0.09% | $3 \times 10^{12}$ | ○ |
| 27 | 25.1 nF | 0.20% | $1 \times 10^{12} \Omega$ | 25.3 nF | 0.20% | $2 \times 10^{12}$ | ○ |
| 28 | 22.8 nF | 0.19% | $1 \times 10^{12} \Omega$ | 22.7 nF | 0.18% | $2 \times 10^{12}$ | ○ |

*At 260° C., for 10 sec.
By Infrared Lamp at 230° C. for 1 min.: No. 25, 26, 27, 28
°Capacity, tan δ: measured at 1 kHz, Insulation: No. 21, 22, 23, 24 Resistance at 25V

What is claimed is:
1. A chip film capacitor capable of being directly soldered comprising a laminate of one or more assemblies, each assembly comprising the following layers (a) to (d):

TABLE 1

| Combination Example No. | Heat Resistant Film Kind | Thickness (μ) | First Heat Resistant Resin Dielectric Kind | Thickness (μ) | Second Heat Resistant Resin Dielectric Kind | Thickness (μ) |
|---|---|---|---|---|---|---|
| 1 | Polyimide | 7.0 | Polyphenylene Oxide | 1.0 | Epoxy Resin | 1.0 |
| 2 | Polyimide | 7.0 | Polyphenylene Oxide | 1.0 | Cyclization Polybutadiene | 1.0 |
| 3 | Polyimide | 7.0 | Polysulfone | 1.0 | Cyclization Polybutadiene | 1.0 |
| 4 | Polyimide | 7.0 | Polyether Sulfone | 1.0 | Cyclization Polybutadiene | 1.0 |
| 5 | Polyimide | 7.0 | Polyphenylene Oxide | 1.0 | Unsaturated Polyester | 1.0 |
| 6 | Polyimide | 7.0 | Polyphenylene Oxide | 1.0 | Diaryl Phthalate | 1.0 |
| 7 | Polyimide | 7.0 | Polyphenylene Oxide | 1.0 | Benzotriazine Resin | 1.0 |
| 8 | Polyparabanic Acid | 12.5 | Polyphenylene Oxide | 1.0 | Cyclization Polybutadiene | 0.5 |
| 9 | Polyimide | 7.0 | Polyphenylene Oxide | 1.0 | Polyphenylene Oxide | 1.0 |
| 10 | Polyimide | 7.0 | Cyclization Polybutadiene | 1.0 | Cyclization Polybutadiene | 1.0 |

TABLE 2

| No. | Initial Characteristic Capacity[*3] | Dielectric Tangent[*3] | Insulation Resist.[*4] | After Heat Resistance Test[*5] Capacity[*3] | Dielectric Tangent[*3] | Insulation Resist.[*4] | Soldering Heat Resistance |
|---|---|---|---|---|---|---|---|
| Combination Example | | | | | | | |
| 1 | 13.4 nF | 0.41% | $1 \times 10^{12}$ Ω | 13.5 nF | 0.50% | $1 \times 10^{12}$ Ω | ○ |
| 2 | 9.9 nF | 0.20% | $2 \times 10^{12}$ Ω | 10.0 nF | 0.20% | $3 \times 10^{12}$ Ω | ○ |
| 3 | 10.4 nF | 0.33% | $2 \times 10^{12}$ Ω | 10.4 nF | 0.31% | $2 \times 10^{12}$ Ω | ○ |
| 4 | 10.8 nF | 0.37% | $3 \times 10^{12}$ Ω | 10.9 nF | 0.36% | $2 \times 10^{12}$ Ω | ○ |
| 5 | 11.3 nF | 0.28% | $2 \times 10^{12}$ Ω | 11.5 nF | 0.27% | $3 \times 10^{12}$ Ω | ○ |
| 6 | 12.1 nF | 0.20% | $2 \times 10^{12}$ Ω | 12.2 nF | 0.20% | $3 \times 10^{12}$ Ω | ○ |
| 7 | 13.5 nF | 0.31% | $1 \times 10^{12}$ Ω | 13.6 nF | 0.31% | $2 \times 10^{12}$ Ω | ○ |
| 8 | 10.6 nF | 0.19% | $2 \times 10^{12}$ Ω | 10.6 nF | 0.1% | $1 \times 10^{12}$ Ω | ○ |
| 9 | 10.1 nF | 0.09% | $2 \times 10^{12}$ Ω | 10.5 nF | 0.08% | $1 \times 10^{12}$ Ω | ○ |
| 10 | 9.7 nF | 0.11% | $2 \times 10^{12}$ Ω | 9.8 nF | 0.12% | $2 \times 10^{12}$ Ω | ○ |
| A[*1] | 9.8 nF | 0.39% | $1 \times 10^{12}$ Ω | 3.8 nF | 4.16% | — | X |
| B[*2] | 10.2 nF | 0.40% | $1 \times 10^{12}$ Ω | — | — | Short-Circuit | X |

[*1]Vapor Coating Type,
[*2]Aluminum Foil Electrode Type,
[*3]Measured at 1 kHz,
[*4]Measured at 25V
[*5]at 260° C., for 10 sec: No. 1, 2, 3, 4, 5, 6, 7, 8, 10.
Heating by Infrared Lamp at 230° C. for 1 min: No. 9, A, B.
A, B; Commercially available Polyester Film Capacitor

TABLE 3

| Combination Example No. | Heat Resistant Film Kind | Thickness (μ) | First Heat Resistant Resin Dielectric Kind | Thickness (μ) | Second Heat Resistant Resin Dielectric Kind | Thickness (μ) |
|---|---|---|---|---|---|---|
| 11 | Polyimide | 7.0 | Polyphenylene Oxide | 1.0 | Epoxy Resin | 1.0 |
| 12 | Polyimide | 7.0 | Polyphenylene Oxide | 1.0 | Cyclization Polybutadiene | 1.0 |
| 13 | Polyimide | 7.0 | Polysulfone | 1.0 | Cyclization Polybutadiene | 1.0 |
| 14 | Polyimide | 7.0 | Polyether Sulfone | 1.0 | Cyclization Polybutadiene | 1.0 |
| 15 | Polyimide | 7.0 | Polyphenylene Oxide | 1.0 | Unsaturated Polyester | 1.0 |
| 16 | Polyimide | 7.0 | Polyphenylene Oxide | 1.0 | Diaryl Phthalate | 1.0 |
| 17 | Polyimide | 7.0 | Polyphenylene Oxide | 1.0 | Benzotriazine Resin | 1.0 |
| 18 | Polyparabanic Acid | 12.5 | Polyphenylene Oxide | 1.0 | Cyclization Polybutadiene | 1.0 |
| 19 | Polyimide | 7.0 | Diaryl Phthalate | 1.0 | Diaryl Phthalate | 1.0 |

(a) a layer of heat resistant film which is not meltable or extremely deformable at a temperature of 260° C., (b) vapor coated metal electrodes provided on a portion of opposite major surfaces of said heat resistant film, (c) a heat resistant dielectric film provided on said vapor coated metal electrodes and containing said heat resistant film where it is not coated by said electrodes, (d) common metal electrodes formed at the side of said laminated layer and containing said vapor coated metal electrodes, wherein said common metal electrodes are comprised of a first metal layer formed at both sides of said laminated layer by plasma sprying and having good adhesion to said heat resistant films and a second metal layer formed on said first metal layer by arc spraying or gas spraying and said second metal layer having good solderability.

2. A chip film capacitor according to claim 1, wherein said heat resistant resin dielectric comprises a thermoplastic resin of glass transition temperature of 170° C. or more.

3. A chip film capacitor according to claim 1, wherein said heat resistant resin dielectric comprises a thermosetting resin which can withstand dip soldering.

4. A chip film capacitor according to claim 1, wherein said heat resistant resin dielectric comprises two layers, one being a polyphenylene oxide layer, and the other being a thermosetting resin layer.

5. A chip film capacitor according to claim 1, wherein said heat resistant resin dielectric comprises two layers, one being a cross-linking polybutadiene or diaryl phthalate resin layer, and the other being a thermoplastic resin layer.

6. A chip film capacitor according to claim 1, wherein said vapor coated metal electrodes are coated on both surfaces of each of said heat resistant films in such a way to leave an uncoated portion along the same end of each of the surfaces of said heat resistant films, and said heat resistant resin dielectric films are formed on said vapor coating metal electrodes in such a way that said vapor coated metal electrodes are exposed in part along the other ends of each of the surfaces of said heat resistant films, and said heat resistant films are laminated in such a way that said exposed portions of said vapor coated metal electrodes of adjacent heat resistant films are at opposite sides to each other.

7. A chip film capacitor according to claim 1, wherein said vapor coated metal electrodes are coated on both surfaces of each of said heat resistant films in such a way to leave an uncoated portion along one end of one surface of each of said heat resistant films and along the other end of the other surface of said each of said heat resistant films, and said heat resistant resin dielectric films being formed on said vapor coated metal electrodes in such a way that each of said vapor coated metal electrodes is exposed in part along an end opposite to the uncoated portion of each of said heat resistant films, and said heat resistant films being laminated in the same direction so that the adjacent vapor coated metal electrodes are exposed at different sides of said laminated layer.

8. A chip film capacitor according to claim 1, wherein said vapor coated metal electrodes are coated on both surfaces of each of said heat resistant films in such a way to leave an uncoated portion along the same end of each of the surfaces of said heat resistant films, and said heat resistant resin dielectric films being formed on said vapor coating metal electrodes in such a way that said vapor coated metal electrodes are exposed in part along the other ends of each of the surfaces of said heat resistant films, said capacitor further comprising additional vapor coated metal electrodes each coated on one of said heat resistant resin dielectric layers of each of said heat resistant films, each of said additional vapor coated metal electrodes being coated in such a way to leave a uncoated portion along an end of each said heat resistant resin dielectric layers at a side where said electrodes coated on said heat resistant films are exposed, said heat resistant films being laminated in the same direction.

* * * * *